United States Patent
Keesey et al.

(10) Patent No.: US 8,355,912 B1
(45) Date of Patent: Jan. 15, 2013

(54) TECHNIQUE FOR PROVIDING CONTINUOUS SPEECH RECOGNITION AS AN ALTERNATE INPUT DEVICE TO LIMITED PROCESSING POWER DEVICES

(75) Inventors: James L. Keesey, Sunnyvale, CA (US); Gerald J. Wilmot, Marina, CA (US)

(73) Assignee: International Business Machines Corporation, Armonk, NY (US)

( * ) Notice: Subject to any disclaimer, the term of this patent is extended or adjusted under 35 U.S.C. 154(b) by 2986 days.

(21) Appl. No.: 09/690,313

(22) Filed: Oct. 17, 2000

Related U.S. Application Data

(60) Provisional application No. 60/202,101, filed on May 4, 2000.

(51) Int. Cl.
*G10L 15/26* (2006.01)

(52) U.S. Cl. ........ 704/235; 704/231; 704/251; 704/270; 704/275

(58) Field of Classification Search ................. 704/235, 704/231, 270.1, 275, 273, 251, 270
See application file for complete search history.

(56) References Cited

U.S. PATENT DOCUMENTS

| | | | |
|---|---|---|---|
| 5,774,841 A * | 6/1998 | Salazar et al. | 704/225 |
| 5,960,399 A | 9/1999 | Barclay et al. | 704/270 |
| 6,085,160 A * | 7/2000 | D'hoore et al. | 704/256.2 |
| 6,185,535 B1 * | 2/2001 | Hedin et al. | 704/270 |
| 6,338,035 B1 * | 1/2002 | Mori | 704/235 |
| 6,463,413 B1 * | 10/2002 | Applebaum et al. | 704/256.2 |
| 6,532,446 B1 * | 3/2003 | King | 704/270.1 |
| 6,658,389 B1 * | 12/2003 | Alpdemir | 704/275 |
| 7,050,977 B1 * | 5/2006 | Bennett | 704/270.1 |
| 2001/0016814 A1 * | 8/2001 | Hauenstein | 704/231 |
| 2003/0046083 A1 * | 3/2003 | Devinney et al. | 704/273 |

FOREIGN PATENT DOCUMENTS

| | | |
|---|---|---|
| EP | 0 851 403 A | 7/1998 |
| EP | 0851403 | 7/1998 |
| JP | 07222248 | 2/1994 |
| JP | 10126852 | 5/1998 |
| WO | WO 99/00719 | 1/1999 |
| WO | WO 99/00719 A1 | 1/1999 |

* cited by examiner

*Primary Examiner* — Qi Han
(74) *Attorney, Agent, or Firm* — Sughrue Mion, PLLC

(57) ABSTRACT

A technique for data entry at a device is provided. Initially, voice data is received at the device. The voice data and a device identifier are transmitted to a computer. At the computer, the voice data is translated to text. Next, it is determined whether to filter the translated text. When it is determined that the translated text is to be filtered, a filter is applied to the translated text.

38 Claims, 3 Drawing Sheets

TECHNIQUE FOR PROVIDING CONTINUOUS SPEECH RECOGNITION AS AN ALTERNATE INPUT DEVICE TO LIMITED PROCESSING POWER DEVICES

PROVISIONAL APPLICATION

This application claims the benefit of U.S. Provisional Application No. 60/202,101, entitled, "A TECHNIQUE FOR PROVIDING CONTINUOUS SPEECH RECOGNITION AS AN ALTERNATE INPUT DEVICE TO LIMITED PROCESSING POWER DEVICES SUCH AS PDAS," filed May 4, 2000, by James L. Keesey et al., which is incorporated by reference herein.

FIELD OF THE INVENTION

This invention relates in general to a computer implemented system, and more particularly, to providing continuous speech recognition as an alternate input device to limited processing power devices such as personal digital assistants (PDAs).

BACKGROUND OF THE INVENTION

A personal digital assistant (PDA) is a handheld device that combines computing with other features, such as telephone and/or networking connections. Many PDAs are used as personal organizers and include calendars, e-mail systems, and word processors. Input is typically entered into a PDA via a stylus, rather than through a keyboard or mouse. A stylus is a "pen-like" object that is used to write data on a screen, such as a digital tablet. The stylus has an electronic head that is used to touch the digital tablet, which contains electronics that enable it to detect movement of the stylus and translate the movements into digital signals for the computer.

Some PDAs incorporate handwriting recognition features that enable users to "handwrite" data onto the screen using the stylus. However, conventional handwriting recognition systems sometimes misinterpret written data, which requires users to carefully review and correct written data.

PDAs have become very popular and are increasingly being used by a wide spectrum of people. Unfortunately, these small devices have limited memory, a small display, and operate at slow speeds. Additionally, the use of a stylus to enter data prevents some disabled persons from using PDAs.

Thus, there is a need in the art for an improved technique of inputting data into a device with limited resources.

SUMMARY OF THE INVENTION

To overcome the limitations in the prior art described above, and to overcome other limitations that will become apparent upon reading and understanding the present specification, the present invention discloses a method, apparatus, and article of manufacture for a technique for providing continuous speech recognition as an alternate input device to limited processing power devices such as personal digital assistants (PDAs).

According to an embodiment of the invention, a technique for data entry at a device is provided. Initially, voice data is received at the device. The voice data and a device identifier are transmitted to a computer. At the computer, the voice data is translated to text. Next, it is determined whether to filter the translated text. When it is determined that the translated text is to be filtered, a filter is applied to the translated text.

BRIEF DESCRIPTION OF THE DRAWINGS

Referring now to the drawings in which like reference numbers represent corresponding parts throughout.

DETAILED DESCRIPTION

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Hardware Architecture

Figure 1:
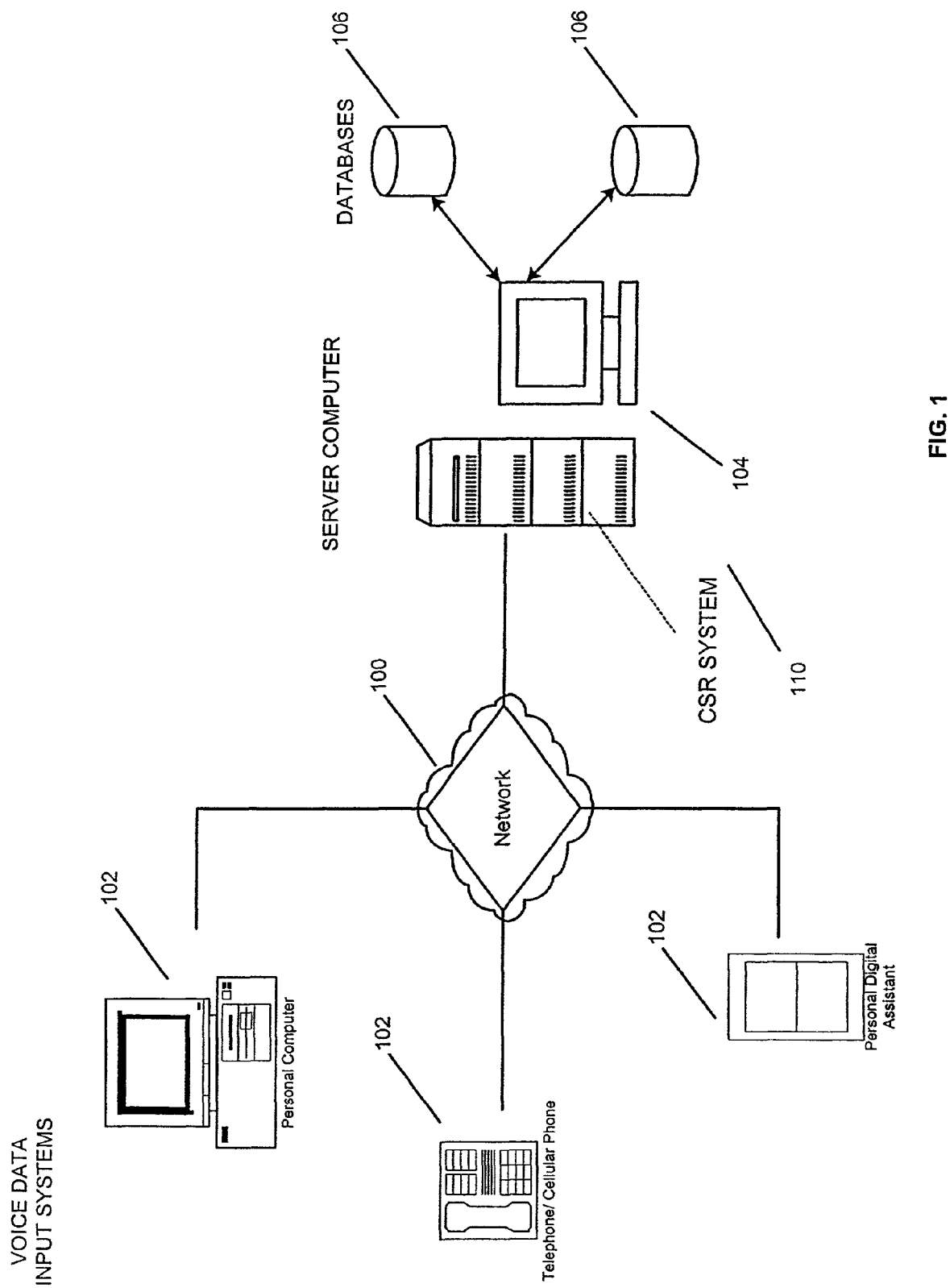
FIG. 1 is a schematic that illustrates a hardware environment of an embodiment of the present invention.

FIG. 1 is a schematic illustrates a hardware environment of an embodiment of the present invention, and more particularly, illustrates a typical distributed computer system using a network 100 to connect voice data input devices 102 ("clients") to a server computer 104 executing computer programs, and to connect the server system 104 to data sources 106. A data source 106 may store, for example, user profiles that include voice print records. A typical combination of resources may include voice data input devices 102 that are, for example, personal computers or workstations, telephones or cell phones, or personal digital assistants (PDAs). A server computer 104 may be, for example, a personal computer, workstation, minicomputer, or mainframe. These systems are coupled to one another by various networks, including LANs, WANs, SNA networks, and the Internet. Some voice data input devices 102 (e.g., a personal computer or a personal digital assistant) and the server computer 104 additionally comprise an operating and one or more computer programs.

The server software includes a Continuous Speech Recognition (CSR) System 110, which comprises one or more computer programs for converting voice to text, filtering the text, and converting the text to an appropriate format. The server computer 104 also uses a data source interface and, possibly, other computer programs, for connecting to the data sources 106. The voice data input devices 102 are bi-directionally coupled with the server computer 104 over a line or via a wireless system. In turn, the server computer 104 is bi-directionally coupled with data sources 106.

The operating system and computer programs are comprised of instructions which, when read and executed by the voice data input devices 102 and server computer 104, cause the devices and computer to perform the steps necessary to implement and/or use the present invention. Generally, the operating system and computer programs are tangibly embodied in and/or readable from a device, carrier, or media, such as memory, other data storage devices, and/or data communications devices. Under control of the operating system, the computer programs may be loaded from memory, other data storage devices and/or data communications devices into the memory of the computer for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Continuous Speech Recognition System

In one embodiment, the present invention provides a Continuous Speech Recognition (CSR) System. The CSR System enables devices with limited processing power to provide continuous speech recognition. That is, most handheld devices (e.g., PDAs or cellular phones) do not have the processing power to perform continuous speech recognition. This, combined with their small size, forces users to use a stylus to peck at an input area, which makes these devices extremely difficult to use by disabled persons. It also prevents individuals from quickly taking notes, updating calendars, or sending e-mail.

With the CSR System, inputting information into the device becomes as simple as speaking. The CSR System could conceivably remove the need for a tactile input device. The CSR System also allows for devices that are too small to have an input pad or screen, such as wrist worn devices, to be used as input devices.

Figure 2:
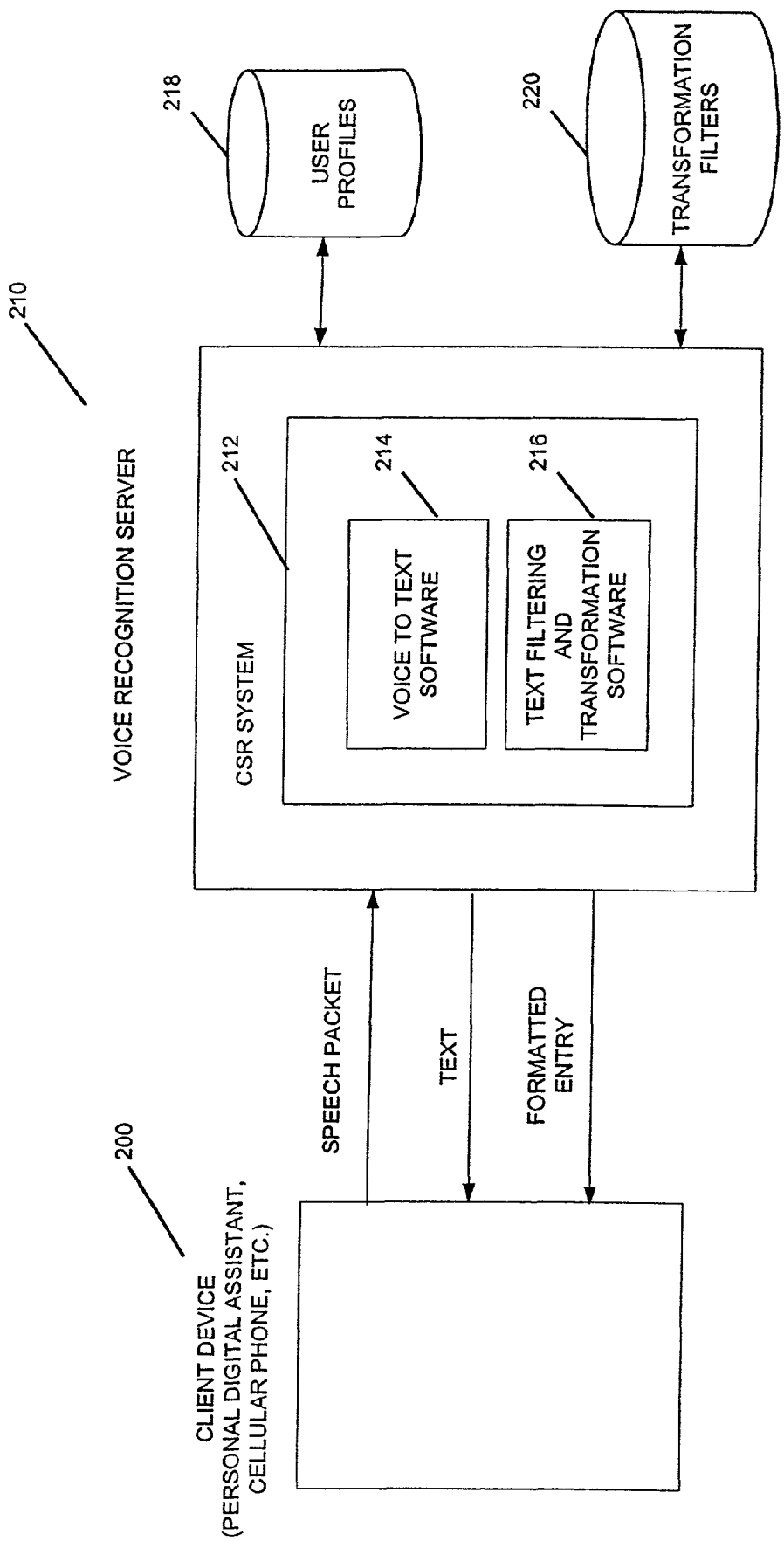
FIG. 2 is a schematic that illustrates a CSR System 212 and its environment in one embodiment of the invention.

FIG. 2 is a schematic that illustrates a CSR System 212 and its environment in one embodiment of the invention. The CSR System 212 is at a voice recognition server 210. The CSR System 212 establishes a synergistic relationship between one or more client devices (limited processing power devices) and one or more voice recognition servers. For ease of illustration, one client device 200 and one voice recognition server 210 are depicted. The client device 200 is able to record and/or relay speech. The CSR System 212 comprises voice to text software 214 and text filtering and transformation software 216.

Generally, the client device 200 captures speech and sends it to the voice recognition server 210 for translation and transformation. The voice recognition server 210 sends the transformed information back to the client device 200, which then incorporates it into its target application (e.g., a calendar, e-mail, or notes application).

Prior to using the CSR System 212, a user submits information to the voice recognition server 210. The information comprises a user profile 218 that is stored in a data store. The user profile includes a "voice print" associated with the way a user speaks, information about one or more target applications that are to receive data, one or more client device ("unit") identifiers ("ids") that identify a particular device used by the user, and contact information for the user, including an e-mail ("electronic mail") address.

Initially, a user records speech that is stored as a voice print at the voice recognition server. For example, each user may be asked to speak particular text, such as a paragraph of a book. The spoken text is a voice print. Each user speaks a little differently, with slightly different pauses and intonations. Thus, a voice print may be used to identify a user. Additionally, the voice print is used by the CSR System 212 to better convert voice to text.

Once the user profile 218 is stored at the voice recognition server 210, a user can input voice data into a client device 200 by speaking into a speech recorder/relayer at the client device 200. The user speaks keywords and other speech. The keywords indicate to the CSR System 212 that particular types of information follow. Sample keywords include, without limitation, the following: CALENDAR ENTRY, DATE, TIME, SEND NOTE, ADDRESS ENTRY, NOTEPAD ENTRY. To schedule a meeting in a calendar application, a user might speak the following into the client device 200: CALENDAR ENTRY DATE Dec. 1, 2000 TIME 10:00 a.m. SUBJECT meeting on projectx.

The client device 200 uses this voice data to generate a speech packet that consists of the voice data (e.g., the phrase), data appropriate to the target application (e.g., the calendar application), and a unit id (client device identifier). The client device 200 sends the speech packet to the voice recognition server 210 over any available communication system, such as cellular modem and/or an Internet connection.

The voice recognition server 210 receives the speech packet, extracts the unit id, and uses it to retrieve the user's voice print from a data store. The voice to text software 214 uses the voice print to translate the voice data in the speech packet to text. This results in "translated text."

Next, the text filtering and transformation software 216 attempts to extract one or more keywords from the translated text. In one embodiment, the one or more keywords are expected to be at the beginning of the translated text. If no keywords are found, the CSR System 212 returns the translated text to the client device 200 by, for example, e-mail. On the other hand, if one or more keywords are extracted, the CSR System 212 identifies and retrieves a transformation filter ("filter") 220 to be used to format the translated text to a particular format (e.g., specific to a particular application and/or a specific device). For example, if the one or more keywords indicate that the voice data is associated with a calendar application and represents a CALENDAR ENTRY, the text filtering and transformation software 216 determines that a transformation filter is to be used and retrieves a calendar filter from the transformation filters 220 to format the data to be sent to a client device 200 as a calendar entry. The formatting will not only format the translated text for a particular application (e.g., a calendar application), but the formatting will also format the translated text for a particular client device 200 (e.g., a particular brand of a PDA). Then, the CSR System 212 returns the filtered text to the client device 200 using an appropriate communication channel (e.g., via an e-mail over a cellular modem and/or the Internet).

The client device 200 receives the translated and transformed speech packet and routes it to the targeted application (e.g., a calendar application) for processing.

If the client device 200 is a cellular telephone, a user can input speech via the cellular telephone. The speech and unit id are sent to the voice recognition server 210. The CSR System 212 at the voice recognition server 210 converts the voice data to translated text, applies a filter if that is appropriate to generated filtered text, and returns either translated text or filtered text via e-mail to the user's device, as specified in the user profile.

Thus, with the CSR System 212, to schedule a meeting in a calendar application, a user might speak the following into the client device 200: CALENDAR ENTRY DATE Dec. 1, 2000 TIME 10:00 a.m. SUBJECT meeting on projectx. Then, the CSR System 212 formats the voice data as a calendar entry, ready to be incorporated into a calendar. On the other hand, in a conventional system, a user would have to open the calendar application, locate the date and time, and type or write in the subject information. On a PDA, this typically requires use of a stylus, which is difficult to use for many people, especially those who are disabled. Additionally, it is not possible with conventional systems to generate a calendar entry with just a cellular phone.

Figure 3:
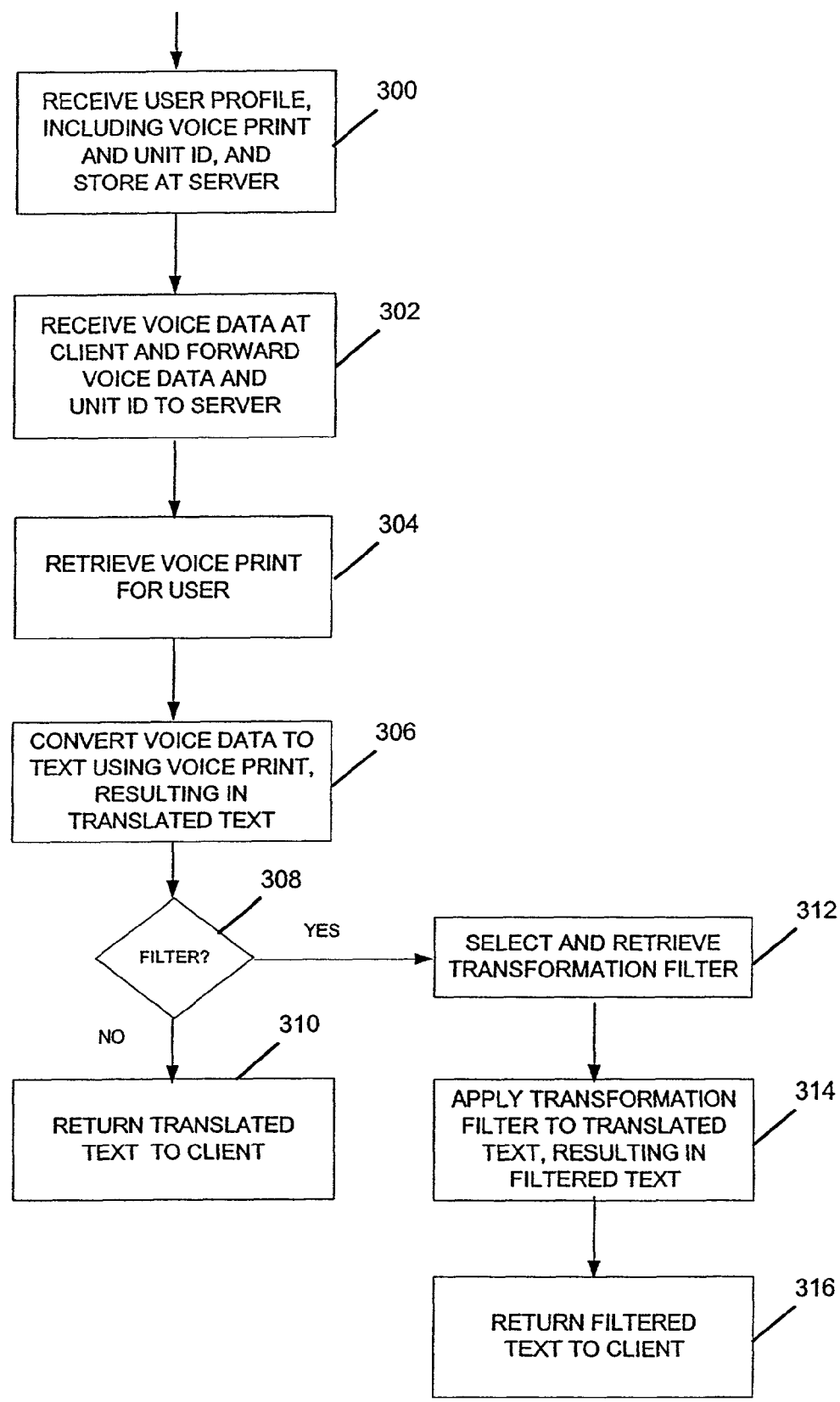
FIG. 3 is a flow diagram illustrating a process performed by the CSR System 212 in one embodiment of the invention.

FIG. 3 is a flow diagram illustrating a process performed by the CSR System 212 in one embodiment of the invention. It is to be understood that, in one embodiment, the CSR System 212 encompasses both the voice to text software 214 and the text filtering and transformation software 216.

In block 300, the CSR System 212 receives a user profile 218, including a voice print and a unit id, and stores the user profile 218 at the voice recognition server 210. In block 302, a client device 200 receives voice data and forwards the voice data and a unit id to the voice recognition server 210. In block 304, the CSR System 212 at the voice recognition server 210 retrieves a voice print for the user based on the unit id. In block 306, the CSR System 212 converts the voice data to text using the voice print, resulting in translated text. In block 308, the CSR System 212 determines whether a filter is to be applied. If so, the CSR System 212 continues to block 312, otherwise, the CSR System 212 continues to block 310. In block 310, the CSR System 212 returns translated text to the client device 200. In block 312, the CSR System 212 selects and retrieves a transformation filter 220. In block 314, the CSR System 212 applies the transformation filter to the translated text, resulting in filtered text. In block 316, the CSR System 212 returns filtered text to the client device 200. In one embodiment, the CSR System 212 returns the filtered text to an application at the client device 200.

CONCLUSION

This concludes the description of embodiments of the invention. The following describes some alternative embodiments for accomplishing the present invention. For example, any type of computer, such as a mainframe, minicomputer, or personal computer, or computer configuration, such as a time-sharing mainframe, local area network, or standalone personal computer, could be used with the present invention.

The foregoing description of embodiments of the invention has been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A method of data entry at a device, comprising:
receiving voice data at the device;
transmitting the voice data and a device identifier to a computer; and
at the computer,
translating the voice data to text;
determining whether to filter the translated text; and
if it is determined that the translated text is to be filtered, applying a filter to the translated text;
wherein the voice data is translated to text using a voice print, and the translated text is returned to the device,
wherein the voice print is retrieved from a datastore based on the device identifier, and
wherein the applying of the filter comprises extracting keywords from the translated text, selecting the filter based on the extracted keywords, and applying the selected filter to transform the translated text to a format specific to at least one of a particular application or the device.

2. The method of claim 1, further comprising storing a user profile in a data store connected to the computer.

3. The method of claim 2, wherein the user profile comprises a voice print.

4. The method of claim 1, wherein the device identifier comprises a unit identifier which identifies a particular device used by a user.

5. The method of claim 1, wherein determining comprises extracting one or more key words from the translated text.

6. The method of claim 5, wherein a filter is selected based on one or more extracted key words.

7. The method of claim 1, wherein applying the filter comprises formatting the translated text.

8. The method of claim 7, wherein formatting comprises formatting the translated text for an application.

9. The method of claim 7, wherein formatting comprises formatting the translated text for the device.

10. The method of claim 1, further comprising returning translated text to the device.

11. The method of claim 1, further comprising returning filtered text to the device.

12. The method of claim 11, further comprising returning the filtered text via an electronic mail message.

13. The method of claim 1, further comprising returning data to a device other than the device at which voice data was received.

14. An apparatus, comprising:
a device for receiving and transmitting data;
a computer having a data store coupled thereto, wherein the data store stores data, connected to the device; and
one or more computer programs, performed by the computer for:
receiving voice data and a device identifier from the device;
translating the voice data to text;
determining whether to filter the translated text; and
if it is determined that the translated text is to be filtered, applying a filter to the translated text;
wherein the voice data is translated to text using a voice print, and the translated text is returned to the device,
wherein the voice print is retrieved from a datastore based on the device identifier, and
wherein the applying of the filter comprises extracting keywords from the translated text, selecting the filter based on the extracted keywords, and applying the selected filter to transform the translated text to a format specific to at least one of a particular application or the device.

15. The apparatus of claim 14, further comprising storing a user profile in a data store connected to the computer.

16. The apparatus of claim 15, wherein the user profile comprises a voice print.

17. The apparatus of claim 14, further comprising returning data to a device other than the device at which voice data was received.

18. The apparatus of claim 14, wherein determining comprises extracting one or more key words from the translated text.

19. The apparatus of claim 18, wherein a filter is selected based on one or more extracted key words.

20. The apparatus of claim 14, wherein applying the filter comprises formatting the translated text.

21. The apparatus of claim 20, wherein formatting comprises formatting the translated text for an application.

22. The apparatus of claim 20, wherein formatting comprises formatting the translated text for the device.

23. The apparatus of claim 14, further comprising returning translated text to the device.

24. The apparatus of claim 14, further comprising returning filtered text to the device.

25. The apparatus of claim 24, further comprising returning the filtered text via an electronic mail message.

26. A method of data entry at a device, comprising:
receiving voice data at the device;
transmitting the voice data and a device identifier to a computer; and
at the computer,
translating the voice data to text;
determining whether to filter the translated text; and
if it is determined that the translated text is to be filtered, applying a filter to the translated text;
wherein the voice data is translated to text using a voice print, and the translated text is returned to the device,
wherein the voice print is retrieved from a datastore based on the device identifier, and
wherein the applying of the filter comprises extracting keywords from the translated text, and applying the filter to transform the translated text to a format specific to a particular application.

27. An article of manufacture comprising a program storage medium readable by a computer and embodying one or more instructions executable by the computer to process data entered at a device, comprising:
receiving voice data at the device;
transmitting the voice data and a device identifier to a computer; and
at the computer,
translating the voice data to text;
determining whether to filter the translated text; and
if it is determined that the translated text is to be filtered, applying a filter to the translated text;
wherein the voice data is translated to text using a voice print, and the translated text is returned to the device,
wherein the voice print is retrieved from a datastore based on the device identifier, and
wherein the applying of the filter comprises extracting keywords from the translated text, selecting the filter based on the extracted keywords, and applying the selected filter to transform the translated text to a format specific to at least one of a particular application or the device.

28. The article of manufacture of claim 27, further comprising storing a user profile in a data store connected to the computer.

29. The article of manufacture of claim 28, wherein the user profile comprises a voice print.

30. The article of manufacture of claim 27, further comprising returning data to a device other than the device at which voice data was received.

31. The article of manufacture of claim 27, wherein determining comprises extracting one or more key words from the translated text.

32. The article of manufacture of claim 31, wherein a filter is selected based on one or more extracted key words.

33. The article of manufacture of claim 27, wherein applying the filter comprises formatting the translated text.

34. The article of manufacture of claim 33, wherein formatting comprises formatting the translated text for an application.

35. The article of manufacture of claim 33, wherein formatting comprises formatting the translated text for the device.

36. The article of manufacture of claim 27, further comprising returning translated text to the device.

37. The article of manufacture of claim 27, further comprising returning filtered text to the device.

38. The article of manufacture of claim 37, further comprising returning the filtered text via an electronic mail message.

* * * * *